United States Patent Office 2,852,077
Patented Sept. 16, 1958

2,852,077

PROCESS OF IMPROVING AND MAINTAINING THE WATER PERMEABILITY OF GEOLOGICAL FORMATIONS

Thomas G. Cocks, Edwardsville, Ill., assignor to National Aluminate Corporation, Chicago, Ill., a corporation of Delaware No Drawing. Application April 27, 1955
Serial No. 504,367

6 Claims. (Cl. 166—9)

The present invention relates to a method of improving and maintaining the water permeability of geological formations. More particularly, it relates to aqueous liquids suitable for use as input fluids in the secondary recovery of petroleum by water flooding.

With the ever increasing demand for petroleum and petroleum products the last few decades have given rise to a greater interest in the secondary recovery of petroleum from spent wells. Large amounts of oil are contained in reservoir rock which are generally found to be located in areas adjacent to existing oil pools that have long since been depleted of their supply of oil.

A commonly used method for recovering oil entrained in the reservoir rock located adjacent to existing oil well sites is to release the oil from its natural geological formation by a process known as water flooding. The simplest form of this process consists of forcing water through the oil bearing reservoir rock so that it moves the oil contained therein forward into the pockes of existing wells.

In order to place the water used in the operations into the oil bearing strata it is generally the practice to pump it under pressure into a number of wells in a given area and allow it to be forced into the oil bearing formation. These wells into which the water is pumped are known as input wells. The wells from which the free oil is collected and recovered are known as producing wells. In conducting water flood operations of this type thorough consideration must be given to the variables of a given operation such as the pore size, permeability and porosity of the openings in the strata through which the water is to be pumped as well as the density and surface tension of the oil contained therein. The composition of the oil bearing strata as well as the type of water present therein is extremely important in determining the extent of the success that will be achieved.

Experience has shown that the water forced into the formation through the input wells must be of a type whereby it does not plug the formation, and preferably it should be so composed that its passage through the formation will tend to improve the permeability thereof. As a general rule, the water used in the treating of reservoir rock in water flood operations must be chemically and mechanically treated to render it suitable for such use. If raw well water is used, it is generally filtered, coagulated and treated with chemicals to render it non-corrosive as well as to remove or stabilize any hardness present. In many instances, water is recirculated through the entire system, the produced oil separated and the water is reused in the flooding of the formation. As in the case of well water, such recovered water must be treated to render it suitable for use in the subsequent input operation.

The water most suitable for use in a given water flood operation should be compatible with the water contained in the oil producing strata. This water contained in the oil bearing strata is generally referred to as connate water and contains large amounts of carbon dioxide which makes it acidic. It is desirable to take the water placed in the input well and treat it with acidic materials such as hydrochloric or sulfuric acid to lower the pH whereby it corresponds to the pH of the connate water of the oil bearing strata. This particular operation, however, has the disadvantage of requiring a close and careful check being kept on the process of pH adjustment since if too much acid is added to the input water the pH falls to an abnormally low point and the water is rendered unsuitable for use in the water flooding process. In a similar fashion, if the water contains too many heavy metal ions, e. g. Ba, Mn, Fe, etc., insoluble precipitates form in the formations which tends to decrease the permeability thereof. Many of the metal ions that are believed to plug and clog the oil bearing strata are found in the formation itself. It is desirable, therefore, to provide a treatment whereby such metal ions are impeded in their plugging tendencies as well as a treatment which will not only impede plugging of such formations but will also uniformly improve the porosity and permeability thereof.

It, therefore, becomes an object of this invention to maintain geological formations and particularly the face of such formations, in a permeable condition.

Another object of the invention is to render harmless suspended and dissolved formation plugging metal ions from water used for water flooding purposes.

A further object is to maintain the pH of the water flood injection water at a point comparable to the connate waters present in the formation.

Still another object is to provide a simple medium for accomplishing the above by the use of unobjectionable chemical treatment.

An additional object is to adjust the pH of the input water used in water flood operations with a chemical which will not give radical pH fluctuations.

A further object is to provide a chemical which is readily soluble in the aqueous media used in water flooding which is high in dissolved solids.

A still further object is to provide a chemical which does not form objectionable scale or precipitates in water.

Still another object is to provide a material which will be effective at extremely low dosages.

Other objects will appear hereinafter.

In accordance with the invention it has been found that the water permeability of geological formations may be maintained and improved by contacting such formations with a fraction of a percent by weight of a hydroxy substituted carboxylic acid of a particular type as hereafter defined. It has also been found that aqueous liquids suitable as input fluids for use in the secondary recovery of petroleum by water flooding may be produced by adding to water an acid of the type previously described in amounts sufficient to render the pH similar to that occurring in the connate waters present in the oil bearing formation.

The hydroxy substituted carboxylic acids that are preferred are those having calcium salts which are soluble in water at 20° C. to the extent of at least 500 parts per million and which have a dissociation constant ($K_1$) of from $2\times10^{-3}$ to $1\times10^{-5}$. Examples are such acids as malic, tartaric, citric, gluconic, lactic and salicylic. While all of the acids described above give good results when used in the practices of the invention, those which have given outstanding results are the hydroxy substituted polycarboxylic acids, particularly citric acid. When used in water flood operations, the acids are generally dissolved in the water just prior to placement into the injection well. The range of dosages to the input water will usually vary from approximately 100 to 500 parts of the hydroxy substituted carboxylic acid per million parts of solution depending upon the nature of water used as well as the characteristics and composition of the connate water of the formation in which the input water is to be injected.

While several hundred parts per million of the hydroxy substituted carboxylic acids are preferably added to the input water, due to further dilution and because some of the acid is lost by adsorption, the effective operational dosage is believed to be around 1 to 30 parts of the hydroxy substituted carboxy acid per million parts of solution when the treated water actually contacts the interior of the formation. Thus, an input water treated with 300 parts per million of a hydroxy substituted carboxylic acid would actually place into the formation only a much smaller concentration of the acid. The acid will be adsorbed by the metal surfaces of the input well and will also be diluted with relatively large amounts of water naturally present in the system well and adjacent formation. Hence, a broad range of concentrations for the purpose of the invention is 1 to 500 parts per million (.0001% to 0.05% by weight).

In order to increase the effectiveness of the input water, it is desirable to add an anionic wetting agent with the hydroxy substituted carboxylic acid. This wetting agent is usually added in the range of from between 2% to 20% by weight of the hydroxy substituted carboxylic acid, and should be water soluble at the concentrations used. Examples of such wetting agents are given in the article entitled Synthetic detergents up to date II, by John W. McCutcheon, appearing in Soap and Sanitary Chemicals, July, August, September, and October 1952. A type of anionic wetting agent that has given especially good results are the alkylated benzene sodium sulfonates where the alkyl group contains from 8 to 20 carbon atoms.

The hydroxy substituted carboxylic acids used in this invention are known chelating agents and will tend to form complexes with certain metals such as iron, barium, strontium and calcium, but it is believed that the results obtained when using the acids cannot be predicated on such complexing action alone. In any event, the results achieved are superior to those heretofore known.

In the treating of water flood wells where samples of connate water are unavailable due to the nature of the flood, a simple method may be used to determine the correct amount and type of acid. Several core samples of the strata through which the water is to be pumped are obtained. The core samples are then dried, placed in water and treated to give a variety of pH ranges. By observing the expansion or contraction of the core samples, it is readily ascertainable which pH produces a core with the least amount of swelling. As an illustration of this phenomenon, a core sample taken from a water flood field located in the Midwestern portion of the United States was placed in an aqueous medium and the pH was varied from 5 to 9. At pH 5, the percentage of change, based on dry volume, was 18%, whereas at pH 9 the change was 29%. Hence, the preferred pH of the input water would be 5 and sufficient citric acid or other hydroxy substituted acid of the type herein described is added to the input water to give this pH.

The best mode contemplated for the practice of the invention and an evaluation of the results is illustrated by the following example:

EXAMPLE

Two output wells in a water producing operation were selected as a test situs. The leases upon which these wells stood were located in the Midwestern portion of the United States. The duration of the test was about five months.

The feeding of each well was on a "slug" dosage basis. The formula used contained 93.1% by weight of citric acid and 6.9% by weight of a mixed alkyl ($C_{12}$–$C_{18}$) benzene sodium sulfonate. The rate of feed to the well head in each instance was sufficient to place from 1 to 20 parts of the formula per million parts of input solution into the oil containing strata.

The results of the test were measured in terms of the specific capacity of each well. This was determined by dividing the gallons per minute fed into the system by the feet of draw-down. Draw-down is the difference between the height of the liquid in the output well during pumping and the normal static level in the absence of pumping. The results of these tests are shown in the following table:

Table

| Well Number | Time in Days Between Application | Gallons Per Minute | Feet Draw-Down | Specific Capacity |
|---|---|---|---|---|
| I | 0 | 150 | 18.8 | 8.0 |
|   | 19 | 450 | 27 | 16.6 |
|   | 104 | 325 | 15 | 21.0 |
| II | 0 | 325 | 11 | 28.6 |
|   | 75 | 375 | 11 | 34.0 |
|   | 62 | 375 | 10 | 37.5 |

In each instance, the specific capacity increased to an appreciable extent indicating a substantial improvement in the permeability of the formation as compared to the results prior to the treatment.

While the hydroxy substituted carboxylic acids may be used alone they can be combined in any proportion with each other with good results being obtainable in each such instance. Such mixtures may also be mixed with anionic wetting agents as hereinbefore shown.

While the hydroxy substituted carboxylic acids are capable of use in water flood secondary recovery operations of petroleum, their use is not limited to such applications. They are advantageously used to treat natural wells to improve the flow rate of water into and out of such wells into the surrounding geological formations. In such wells, the water pocket is generally surrounded by a porous sand formation which is normally permeable to the ingress and egress of water. By adding but a few parts per million, e. g., 1 to 20 p. p. m., of the hydroxy substituted carboxylic acids to the well water it has been found that the permeability of the adjacent strata is substantially increased and the ingress and egress of water is materially improved. By allowing the natural water contained in the well pocket to flow freely through the face of the pocket strata, several advantageous results are achieved. For instance, the filtration of any sediment present in water is accomplished. If the face of the water pocket is blocked with insoluble precipitates, the productivity of the well tends to diminish.

The practices of the invention may also be used to treat walls used to dispose of excess produced water. Such systems are known as disposal systems. The use of hydroxy substituted carboxylic acids permits more water to be placed down a well before formation blockage occurs.

The invention is hereby claimed as follows:

1. In the secondary recovery of petroleum from geological formations by water flooding including the steps of providing input water in an input well, forcing the water from the well through an oil-bearing formation adjacent the well site and thereby moving the oil from the formation into an output well, and recovering the oil from the output well, the process for improving and maintaining the water permeability of said formation which comprises providing dissolved in said input water a hydroxy substituted carboxylic acid in an amount selected within the range of .0001% to .05% by weight sufficient to impede plugging of said formation by heavy metal ions present in said input water and in the connate water present in said formation and also sufficient to improve the water permeability of said formation, said acid being soluble in water at 20° C. as its calcium salt to the extent of at least 500 parts per million and having a dissociation constant ($K_1$) of from $2 \times 10^{-3}$ to $1 \times 10^{-5}$.

2. In the secondary recovery of petroleum from geological formations by water flooding including the steps of providing input water in an input well, forcing the water from the well through an oil-bearing formation adjacent the well site and thereby moving the oil from the formation into an output well, and recovering the oil from the output well, the process for improving and maintaining the water permeability of said formation which comprises providing dissolved in said input water a hydroxy substituted polycarboxylic acid in an amount selected within the range of .0001% to .05% by weight sufficient to impede plugging of said formation by heavy metal ions present in said input water and in the connate water present in said formation and also sufficient to improve the water permeability of said formation, said acid being soluble in water at 20° C. as its calcium salt to the extent of at least 500 parts per million and having a dissociation constant ($K_1$) of from $2 \times 10^{-3}$ to $1 \times 10^{-5}$.

3. In the secondary recovery of petroleum from geological formations by water flooding including the steps of providing input water in an input well, forcing the water from the well through an oil-bearing formation adjacent the well site and thereby moving the oil from the formation into an output well, and recovering the oil from the output well, the process for improving and maintaining the water permeability of said formation which comprises providing dissolved in said input water an acid selected from the group consisting of malic, tartaric, citric, gluconic, lactic, and salicylic acids in an amount selected within the range of .0001% to .05% by weight sufficient to impede plugging of said formation by heavy metal ions present in said input water and in the connate water present in said formation and also sufficient to improve the water permeability of said formation.

4. In the secondary recovery of petroleum from geological formations by water flooding including the steps of providing input water in an input well, forcing the water from the well through an oil-bearing formation adjacent the well site and thereby moving the oil from the formation into an output well, and recovering the oil from the output well, the process for improving and maintaining the water permeability of said formation which comprises providing dissolved in said input water citric acid in an amount selected within the range of .0001% to .05% by weight sufficient to impede plugging of said formation by heavy metal ions present in said input water and in the connate water present in said formation and also sufficient to improve the water permeability of said formation.

5. In the secondary recovery of petroleum from geological formations by water flooding including the steps of providing input water in an input well, forcing the water from the well through an oil-bearing formation adjacent the well site and thereby moving the oil from the formation into an output well, and recovering the oil from the output well, the process for improving and maintaining the water permeability of said formation which comprises providing dissolved in said input water citric acid in an amount selected within the range of .0001% to .05% by weight sufficient to impede plugging of said formation by heavy metal ions present in said input water and in the connate water present in said formation and also sufficient to improve the water permeability of said formation, and from 2% to 20% by weight of a water soluble anionic wetting agent, calculated on the weight of the citric acid.

6. In the secondary recovery of petroleum from geological formations by water flooding including the steps of providing input water in an input well, forcing the water from the well through an oil-bearing formation adjacent the well site and thereby moving the oil from the formation into an output well, and recovering the oil from the output well, the process for improving and maintaining the water permeability of said formation which comprises providing dissolved in said input water citric acid in an amount selected within the range of .0001% to .05% by weight sufficient to impede plugging of said formation by heavy metal ions present in said input water and in the connate water present in said formation and also sufficient to improve the water permeability of said formation, and from 2% to 20% by weight, calculated on the weight of the citric acid, of an alkyl benzene sodium sulfonate, the alkyl group of which contains from 8 to 20 carbon atoms.

References Cited in the file of this patent

UNITED STATES PATENTS

| | | |
|---|---|---|
| 2,128,161 | Morgan | Aug. 23, 1938 |
| 2,152,779 | Wagner et al. | Apr. 4, 1939 |
| 2,238,930 | Chamberlain | Apr. 22, 1951 |
| 2,658,036 | Core et al. | Nov. 3, 1953 |
| 2,674,523 | McDonald et al. | Apr. 6, 1954 |

OTHER REFERENCES

"Chemistry of the Metal Chelate Compounds," by Martin and Calvin, published by Prentice-Hall, Inc., 1952, pages 154 and 155.

Sequestering Agents in Aluminum Etching, by Prescott et al., Metal Finishing, October 1953, pp. 65 to 67, inclusive.

Sequestration by Sugar Acids, by Mehltretter, Industrial and Engineering Chemistry, volume 45, No. 12, December 1953, pp. 2,782 to 2,784, inclusive.